(12) United States Patent
Sasaki et al.

(10) Patent No.: US 7,515,823 B2
(45) Date of Patent: Apr. 7, 2009

(54) INTERMITTENTLY PHOTO TAKING DEVICE AND MICROSCOPE SYSTEM HAVING THE SAME DEVICE

(75) Inventors: Yutaka Sasaki, Yokohama (JP); Shigeyuki Mano, Kawasaki (JP)

(73) Assignee: Nikon Corporation, Tokyo (JP)

( * ) Notice: Subject to any disclaimer, the term of this patent is extended or adjusted under 35 U.S.C. 154(b) by 478 days.

(21) Appl. No.: 11/353,940

(22) Filed: Feb. 15, 2006

(65) Prior Publication Data

US 2006/0204236 A1    Sep. 14, 2006

(30) Foreign Application Priority Data

Feb. 16, 2005  (JP)  ............................. 2005-039401
Feb. 6, 2006   (JP)  ............................. 2006-028465

(51) Int. Cl.
 *G03B 17/00* (2006.01)
(52) U.S. Cl. ............... 396/264; 396/265; 348/221.1
(58) Field of Classification Search .............. 396/153, 396/263–265; 348/221.1
See application file for complete search history.

(56) References Cited

U.S. PATENT DOCUMENTS

| | | | | |
|---|---|---|---|---|
| 3,993,560 A * | 11/1976 | Halpern | ...................... | 210/94 |
| 4,273,430 A * | 6/1981 | Fritsche et al. | ............... | 396/153 |
| 4,364,647 A * | 12/1982 | Kawamura et al. | .......... | 396/265 |
| 4,466,721 A * | 8/1984 | Detuzzi | ...................... | 396/265 |
| 4,952,967 A * | 8/1990 | Kazumi et al. | ............... | 396/265 |
| 6,169,575 B1 * | 1/2001 | Anderson et al. | ......... | 348/231.2 |
| 6,724,419 B1 * | 4/2004 | Green et al. | ................... | 348/79 |
| 2007/0031139 A1 * | 2/2007 | Tsukuda | ..................... | 396/265 |
| 2007/0122143 A1 * | 5/2007 | Okamoto | ..................... | 396/432 |

FOREIGN PATENT DOCUMENTS

JP    A 2004-309719    11/2004

* cited by examiner

*Primary Examiner*—Rochelle-Ann J Blackman
*Assistant Examiner*—Michael A Strieb
(74) *Attorney, Agent, or Firm*—Oliff & Berridge, PLC

(57) ABSTRACT

An intermittent photo-taking device for a microscope includes a condition setting means that sets an intermittent photo-taking condition composed of a given time lapse and the number of frames to be photo-taken, an image obtaining means that obtains an image taken under the intermittent photo-taking condition, a setting change means that changes the intermittent photo-taking condition in the middle of an operation based on the intermittent photo-taking condition set by the condition setting means, and a memory that, when the intermittent photo-taking condition has been changed by the setting change means, stores an image taken under the changed intermittent photo-taking condition following an image taken under the intermittent photo-taking condition before changing.

13 Claims, 10 Drawing Sheets

INTERMITTENTLY PHOTO TAKING DEVICE AND MICROSCOPE SYSTEM HAVING THE SAME DEVICE

This application claims the benefit of Japanese Patent Applications No. 2005-039401 and No. 2006-028465 which are hereby incorporated by reference.

BACKGROUND OF THE INVENTION

1. Field of the Invention

The present invention relates to an intermittent photo-taking device for taking a photograph of a sample in a given intermittent photo-taking condition and a microscope system having the photo-taking device.

2. Related Background Art

In a microscope system using a microscope and a digital camera, there has been proposed an intermittent photo-taking device for a microscope that takes and stores photographs of a certain position of a sample such as a cultured cell with a given time lapse controlled by a computer or the like to record the state transformations of the cultured cell, and then continuously reproduces images for observations (for example, Japanese Patent Application Laid-Open No. 4-86615).

In an intermittent photo-taking of a cultured cell or the like, it becomes more frequent that an experiment requires an intermittent photo-taking period from several days to several weeks with a time lapse in units of hours. Accordingly, since the experiment takes a long period of time, you may want to confirm and record the state of the sample on the way of the intermittent photo-taking operation. However, in a conventional intermittent photo-taking device, in order to observe and record the sample after starting the intermittent photo-taking process, you have to stop the process at that point and restart the intermittent photo-taking process after setting photo-taking conditions again.

SUMMARY OF THE INVENTION

The present invention is made in view of the aforementioned problems and has an object to provide an intermittent photo-taking device capable of taking multipoint intermittent photographs which is highly convenient for users, and a microscope system equipped with the intermittent photo-taking device.

According to an aspect of the present invention, there is provided an intermittent photo-taking device including a condition setting means that sets an intermittent photo-taking condition composed of a given time lapse and the number of frames to be photo-taken, an image obtaining means that obtains an image taken under the intermittent photo-taking condition, a setting change means that changes the intermittent photo-taking condition in the middle of an operation based on the intermittent photo-taking condition set by the condition setting means, and a memory that, when the intermittent photo-taking condition has been changed by the setting change means, stores an image taken under the changed intermittent photo-taking condition following an image taken under the intermittent photo-taking condition before changing.

According to another aspect of the present invention, there is provided an intermittent photo-taking device including a condition setting means that sets an intermittent photo-taking condition composed of a given time lapse and the number of frames to be photo-taken, an image obtaining means that obtains an image taken under the intermittent photo-taking condition, and a setting change means that changes the intermittent photo-taking condition in the middle of an operation based on the intermittent photo-taking condition set by the condition setting means. The setting change means detects variation between a current image and a previous image obtained by the image obtaining means, and automatically sets the intermittent photo-taking condition to an intermittent photo-taking condition corresponding to the variation in the image and continues the intermittent photo-taking operation.

According to still another aspect of the present invention, there is provided a microscope system having the intermittent photo-taking device.

The present invention makes it possible to provide an intermittent photo-taking device capable of carrying out a multi-point intermittent photo-taking operation highly convenient for users, and a microscope system having the intermittent photo-taking device.

DESCRIPTION OF THE MOST PREFERRED EMBODIMENTS

Each embodiment of the present invention is explained below with reference to accompanying drawings.

Figure 1:
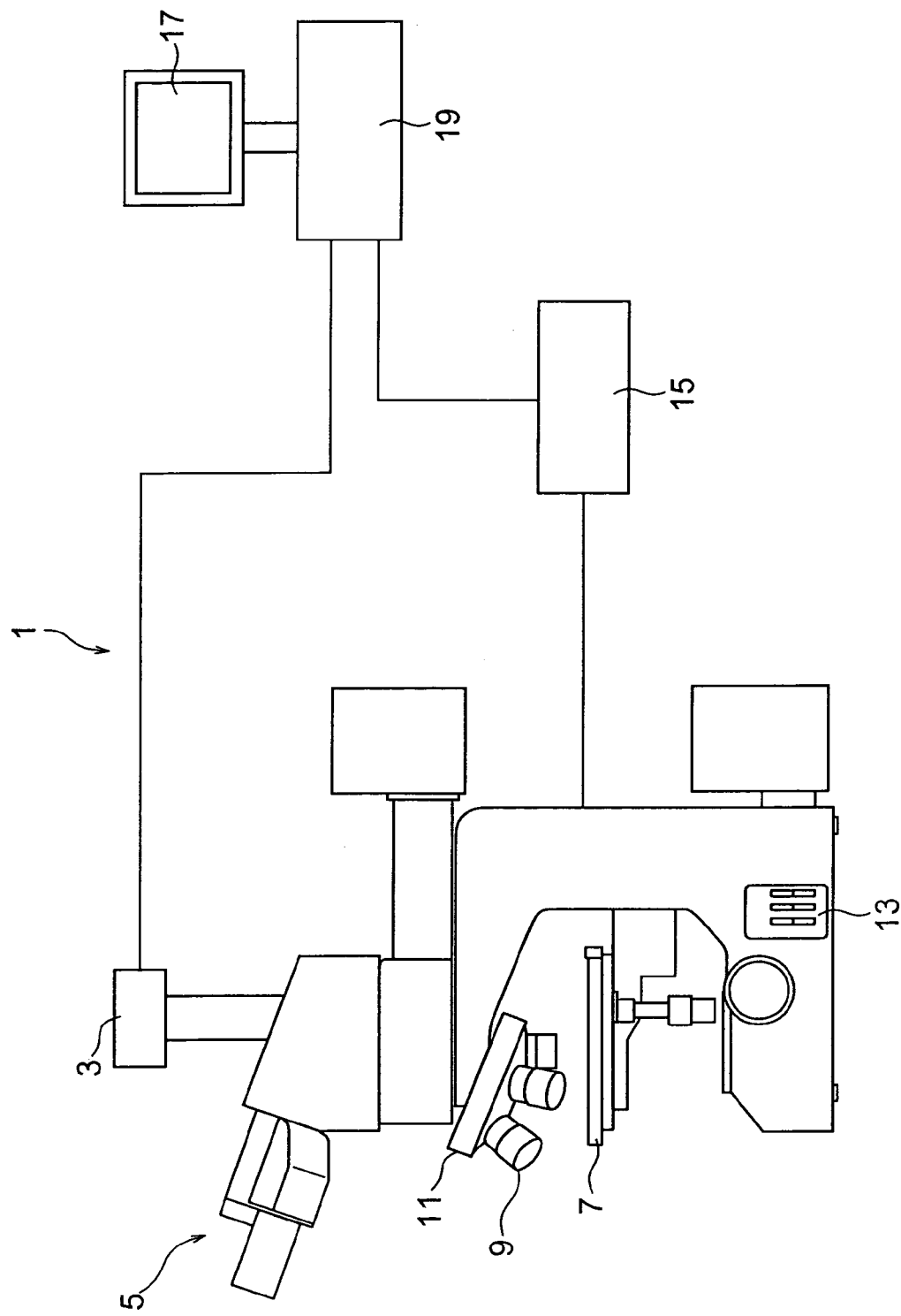
FIG. 1 is a schematic diagram showing a microscope system having an intermittent photo-taking device according to each embodiment of the present invention.

FIG. 1 is a schematic diagram showing a microscope system having an intermittent photo-taking device according to each embodiment of the present invention. In FIG. 1, the microscope system is composed of a microscope 5 that has a camera 3 for taking an image of a sample, a microscope controller 15 that controls movement of the microscope 5 such as moving a stage 7 of the microscope 5, rotating a revolver 11 for changing an objective lens 9, carrying out focusing on the sample (not shown) by an auto focus detector (not shown), operating a shutter for turning on/off an illumination light to the sample, and operating a filter controller for inserting or removing a filter 13 or the like to/from an illumination optical system (not shown), and an intermittent photo-taking device 19 that controls the camera 3 and the microscope controller 15 in synchronization with each other such that the camera 3 takes images of the sample with a given time lapse, the images are recorded and displayed on a monitor 17, and various conditions necessary for the intermittent photo-taking operation are set and recorded.

The microscope 5 has a function that the stage 7 is successively moved to a plurality of sampling positions on the sample, the shutter for the illumination light is released, and a given position is focused by the auto focus detector, in accordance with an instruction by the intermittent photo-taking device 19 based on the information such as sampling positions and focal positions set in the intermittent photo-taking device 19.

The intermittent photo-taking device 19 inputs and stores various photo-taking conditions from an operation window 20 (graphical user interface: GUI) explained later, and controls such as the sampling position on the sample, the time lapse, and the like through the microscope controller 15 on the basis of the conditions. In each sampling position on the sample, an image of the sample is taken by the camera 3, stored in a memory (such as a hard disk) in the intermittent photo-taking device 19, and displayed partially on the monitor 17.

Figure 2:
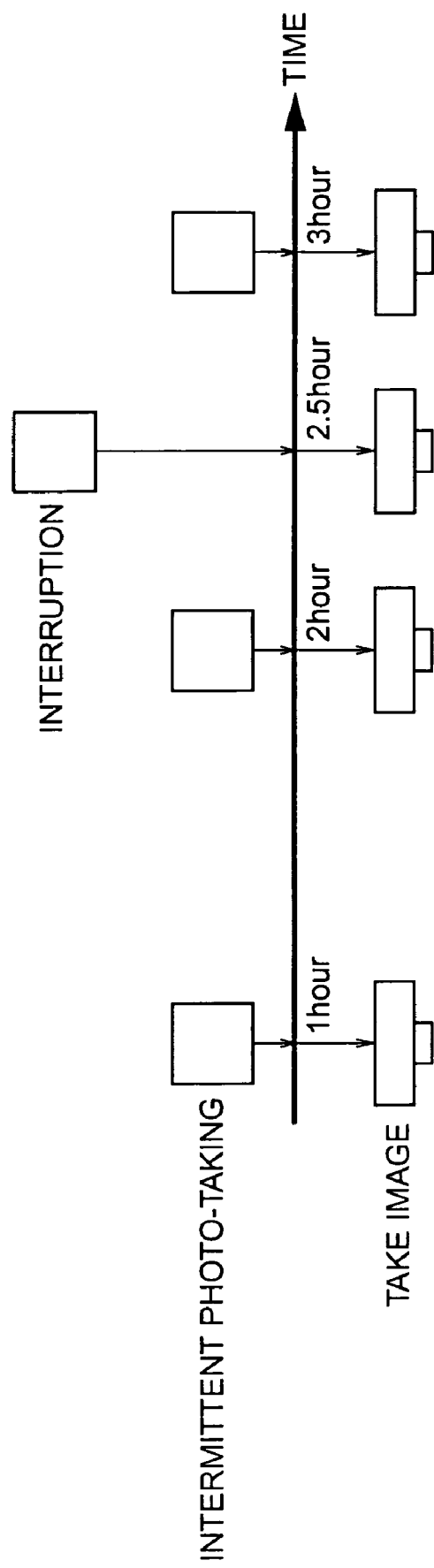
FIG. 2 is a schematic diagram showing an interruption on the way of the intermittent photo-taking operation.

As shown in FIG. 2, the intermittent photo-taking device 19 makes it possible to operate such that, for example, after an intermittent photo-taking operation has been started under an initial condition that a sample is photographed with a time lapse of, for example, one hour, if a user gets a desire to confirm the state of the sample at 2.5 hours from the beginning, by operating a button shown on the operation window 20 explained later, a sample image at 2.5 hours is obtained, stored in chronological order in the data chronologically stored in the memory, and displayed on the monitor 17 to be confirmed the state of the sample. After that, images of the sample are taken in accordance with the initial condition of the intermittent photo-taking condition. Specifically, after taking the image at 2.5 hours, an image at 3 hours is taken and stored in the memory. After that the intermittent photo-taking operation is continued until satisfying the initial condition. In this manner, the user can obtain a sample image for observation at any time without making any influence on the intermittent photo-taking operation set initially. Incidentally, although it is explained that the sample image at 2.5 hours is stored automatically, it may be constructed such that after confirming the photographed image by a current-image-display window 22 explained later, the user can choose whether the image is to be stored or not. Incidentally, the time lapse can be set arbitrarily.

An example of an operation window of an intermittent photo-taking device according to each embodiment of the present invention is explained with reference to FIG. 3. An operation window (GUI) 20 is displayed on the monitor 17. The operation window 20 is composed of a taken-image-series-display window 21 that displays a series of images taken with a given time lapse set at a plurality of sampling positions selected on a sample, a current-image-display window 22 that displays a current image taken only recently, a time-lapse-setting window 23 that sets the time lapse of the intermittent photo-taking operation and the number of frames, a sampling-position-setting window 24 that sets coordinates of a sampling position on the sample, a camera-condition-setting window 25 that sets conditions regarding photo-taking by the camera 3, and a start button 26 that starts the multipoint intermittent photo-taking operation.

In the camera-condition-setting window 25, there is provided a gain setting window 27 that sets gain of the camera 3 upon taking images and an exposure-time-setting window 28 that sets exposure time. In the above explanation, although the condition capable of being set by the camera-condition-setting window 25 is gain and an exposure time, when any other condition to be set is there, it is not to be limited to this.

In the taken-image-series-display window 21, a taken image at each sampling position is displayed chronologically in accordance with the time to be taken. In each of a series of taken images, there are a stop button 31 that stops the intermittent photo-taking operation at the very sampling position, a preview button 32 that displays the image data taken so far on the current-image-display window 22, and a capture button 33 that takes an image of a sampling position at other time than given intermittent photo-taking times, displays the image on the current-image-display window 22, and stores as the image taken at the very time. An outline of the movement upon operating the capture button 33 is shown in FIG. 2, and has already been explained before, so the duplicated explanations are omitted.

In the time-lapse-setting window 23, there is an intermittent-image-obtaining button 41, and when the button 41 is operated, a sub-window showing the time lapse and the number of frames is displayed. In this sub-window, a required time lapse and the number of frames to be taken can be set or deleted. After setting the time lapse and the number of frames, by operating a time-lapse-adding button 42, the time lapse and the number of frames are fixed and displayed on the time-lapse-setting window 23. On the other hand, after selecting a condition set in the sub-window, by operating a time-lapse-deleting button 43, the set condition can be deleted. In this example, two conditions are set ((1) and (2) in the widow 23) and are corresponding to respective conditions (1) and (2) in the sampling-position-setting window 24.

In the sampling-position-setting window 24, there is a multi-point-enabling button 51 that determines whether a multi point intermittent photo-taking is carried out or not. When the button 51 is operated, a sub-window that shows X and Y coordinates and Z coordinate in the focusing direction of the stage 7 is displayed. In this sub-window, X, Y and Z coordinates of the sampling position can be set or deleted. After setting X, Y and Z coordinates of the sampling position, by operating a sampling-position-adding button 52, the setting is fixed and displayed on the sampling-position-setting window 24. On the other hand, in this sub-window, after selecting X, Y and Z coordinates of the sampling position having already been set, by operating a sampling-position-deleting button 53, the sampling position which has already been set can be deleted. Incidentally, input of the X, Y and Z coordinates of the sampling position may be carried out by directly inputting the values or after selecting a desired position of the sample through observing the sample by the microscope 5, the X, Y and Z coordinates of the position may be obtained through the microscope controller 15 and registered as a sampling position.

In this example, coordinates values of five sampling positions are set. Each sampling position is linked to the aforementioned data in the time-lapse-setting window 23. For example, as shown in FIG. 3, the display (1) and (2) in the time-lapse-setting window 23 are linked to the data shown (1) and (2), respectively, in the sampling-position-setting window 24.

In the taken-image-series-display window 21, the time-lapse-setting window 23 and the sampling-position-setting window 24, respective scroll bars 34, 35, 44 and 54 are disposed. By operating the scroll bar, images or values hidden in each window can be displayed. The operation window 20 may be suitably designed as a user friendly window according to the functions included in the intermittent photo-taking device 19. Incidentally, this is only an example thereof.

First Embodiment

Then, behavior of a microscope system (hereinafter called as a system) with an intermittent photo-taking device according to a first embodiment of the present invention will be explained with reference to a flowchart shown in FIGS. 4 and 5.

Figure 4:
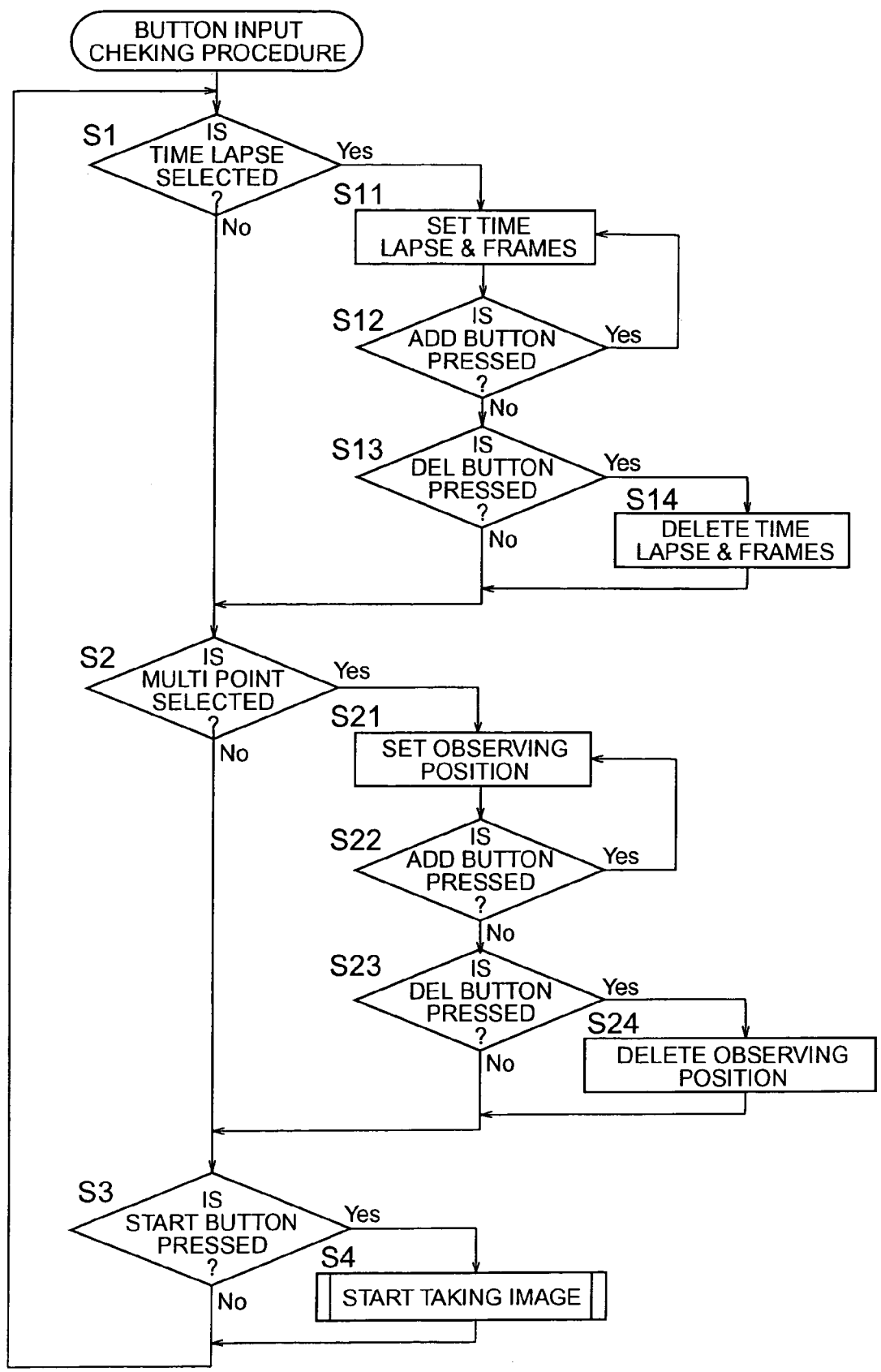
FIG. 4 is a behavior flowchart showing the intermittent photo-taking device according to a first embodiment of the present invention.

In FIG. 4, the system goes around step S1 through step S3 to check whether each input button is pressed or not.

(Step S1)

In the case of the intermittent-image-obtaining button 41 being pressed, steps S11 through S14 are carried out to input time lapse information necessary for the intermittent photo-taking.

As described above, when the intermittent-image-obtaining button 41 is pressed, a time lapse and the number of frames are set automatically or manually. The user can change the setting and in steps S12 through S13, the system checks whether the time-lapse-adding button 42 or the time-lapse-deleting button 43 is pressed or not. When the button 42 is pressed (S12), a new time lapse and the number of frames are added and set. This setting can also be changed by the user. When the user carried out the change, the system makes it possible to continue the intermittent photo-taking operation by changing the time lapse along the way.

On the other hand, when the time-lapse-deleting button 43 is pressed (S13), the selected time lapse and the number of frames or the lastly added time lapse and the number of frames are deleted. Accordingly, the operation of the intermittent photo-taking condition deleted from the intermittent photo-taking operation is no longer carried out on and after the next operation.

In this manner, on the way of the intermittent photo-taking operation, the time lapse and the number of frames of the intermittent photo-taking can be added or deleted, and the change can be reflected on and after the next intermittent photo-taking operation.

(Step S2)

In the case of the multi-point-enabling button 51 being pressed, steps S21 through S24 are carried out to input the sampling position information necessary for the intermittent photo-taking operation.

As described above, when the multi-point-enabling button 51 is pressed, X, Y and Z coordinate values of the sampling position are set automatically or manually. The user can change the setting and, in steps S22 and S23, the system checks whether the sampling-position-adding button 52 or the sampling-position-deleting button 53 is pressed or not. When the sampling-position-adding button 52 is pressed (S22), X, Y and Z coordinate values of a new sampling position are added and set. This setting can also be changed by the user. When the change is carried out, the system makes it possible to continue the intermittent photo-taking operation by changing the coordinate values along the way.

On the other hand, when the sampling-position-deleting button 53 is pressed (S23), the selected X, Y, and Z coordinate values of the sampling position or the lastly added X, Y, and Z coordinate values of the sampling position are deleted. Accordingly, the operation of the intermittent photo-taking condition deleted from the intermittent photo-taking operation is no longer carried out on and after the next operation.

In this manner, on the way of the intermittent photo-taking operation, the X, Y, and Z coordinate values of the sampling position of the intermittent photo-taking can be added or deleted, and the change can be reflected on and after the next intermittent photo-taking operation.

Incidentally, the operation window 20 may be constructed such that other than setting time lapse and the number of frames or the X, Y, and Z coordinate values of the sampling position, setting gain and exposure time of the camera 3, and setting various conditions of the microscope 5 such as filters for the microscope 5 can be set, changed or deleted.

(Step S3)

In the case of the start button 26 being pressed, the system starts the intermittent photo-taking operation through the microscope controller 15 and the camera 3 on the basis of the intermittent photo-taking conditions set on the time-lapse-setting window 23 and the sampling-position-setting window 24 (step S4).

In the start photo-taking operation (step S4), the system reads set information regarding time lapse and the number of frames to be photo-taken and the sampling positions (S41). Then, on the basis of X, Y and Z values of the sampling position set initially, the microscope 5 is controlled through the microscope controller 15, and the stage 7 is moved and set onto a predetermined sampling position (S42). Since the stage 7 is moved on the basis of X, Y and Z coordinate values of the sampling position, the system is set with focusing on the predetermined position.

After completion of moving the stage 7, the shutter (not shown) of the illumination optical system is opened, the sample image is taken by the camera 3, and a timer of the intermittent photo-taking device 19 is started (S43). The taken image is displayed on the taken-image-series-display window 21 and the current-image-display window 22 as an image of the first sampling position, and stored in the memory.

Then, the system reads X, Y and Z coordinate values of the second sampling position, controls the microscope 5 through the microscope controller 15, and moves the stage 7 to the second sampling position to stand by (S44). After completion of moving the sample, the stop button 31, the preview button 32, and the capture button 33 provided on the taken-image-series-display window 21, which show the image of the second sampling position, are activated.

After that, the system goes around step S45 through step S49 to check whether each input button is pressed or not.

(Step S45)

When the preview button 32 is pressed, the images already taken at the current sampling position and stored are continuously shown on the current-image-display window 22 (S50).

(Step S46)

When the capture button 33 is pressed, the system opens the shutter (not shown) of the illumination optical system, takes an image of the sample and shows it on the current-image-display window 22, and, then, stores the image as a current image. The behavior has already been described upon explaining the operation window 20, so the duplicated explanations are omitted.

(Step S47)

When the stop button 31 is pressed, X, Y and Z coordinate values of the current sampling position are deleted from the sampling-position-setting window 24 (S52), and the stop button 31 is deactivated. After that, although the multi point intermittent photo-taking operation is continued, since X, Y and Z coordinate values of the current sampling position have already been deleted, the intermittent photo-taking operation regarding the deleted coordinate values of the sampling position is no longer carried out on and after the next operation.

(Step S48)

Whether all of the sampling positions and all the number of frames which are set as the intermittent photo-taking condition have been carried out or not is checked. When all of the sampling positions and all of the number of frames have been completed, the system completes the intermittent photo-taking operation, returns from step S4 in FIG. 4 to step S1, and enters the watching mode that checks whether each button is pressed or not. On the other hand, when not all of the sampling positions or not all the number of frames have been completed, the system proceeds to step S49 and carries out the step.

(Step S49)

When the timer has reached the next photo-taking time, the system proceeds to step S43, and starts taking image automatically. When the timer has not reach the next photo-taking time, the system proceeds to step S45, and carries out step S45 through S49 again.

When all of the intermittent photo-taking operations have been completed, the user can obtain the sample image taken at each sampling position with a predetermined time lapse.

In the above description, it is described that the stop button 31, the preview button 32 and the capture button 33 are activated only when they are connecting to the current sampling position. However, by connecting respective taken-image-series-display windows 21 to time-lapse-setting window 23, when any one of the stop button 31, the preview button 32 and the capture button 33 disposed on each taken-image-series-display window 21 is pressed, it becomes possible to change setting of the system.

Moreover, by connecting respective taken-image-series-display windows 21 to the time-lapse-setting window 23, when the capture button 33 is pressed, the system moves the sample to the connecting sampling position, takes the image, stores in the memory, and displays on the taken-image-series-display window 21 and the current-image-display window 22 available for user's observation. On this occasion, after the taken image of the sampling position is stored and displayed, in order to return to the previous sampling position before pressing the capture button 33, it is preferable that coordinate values of the previous sampling position is stored.

<Variation 1>

Figure 5:
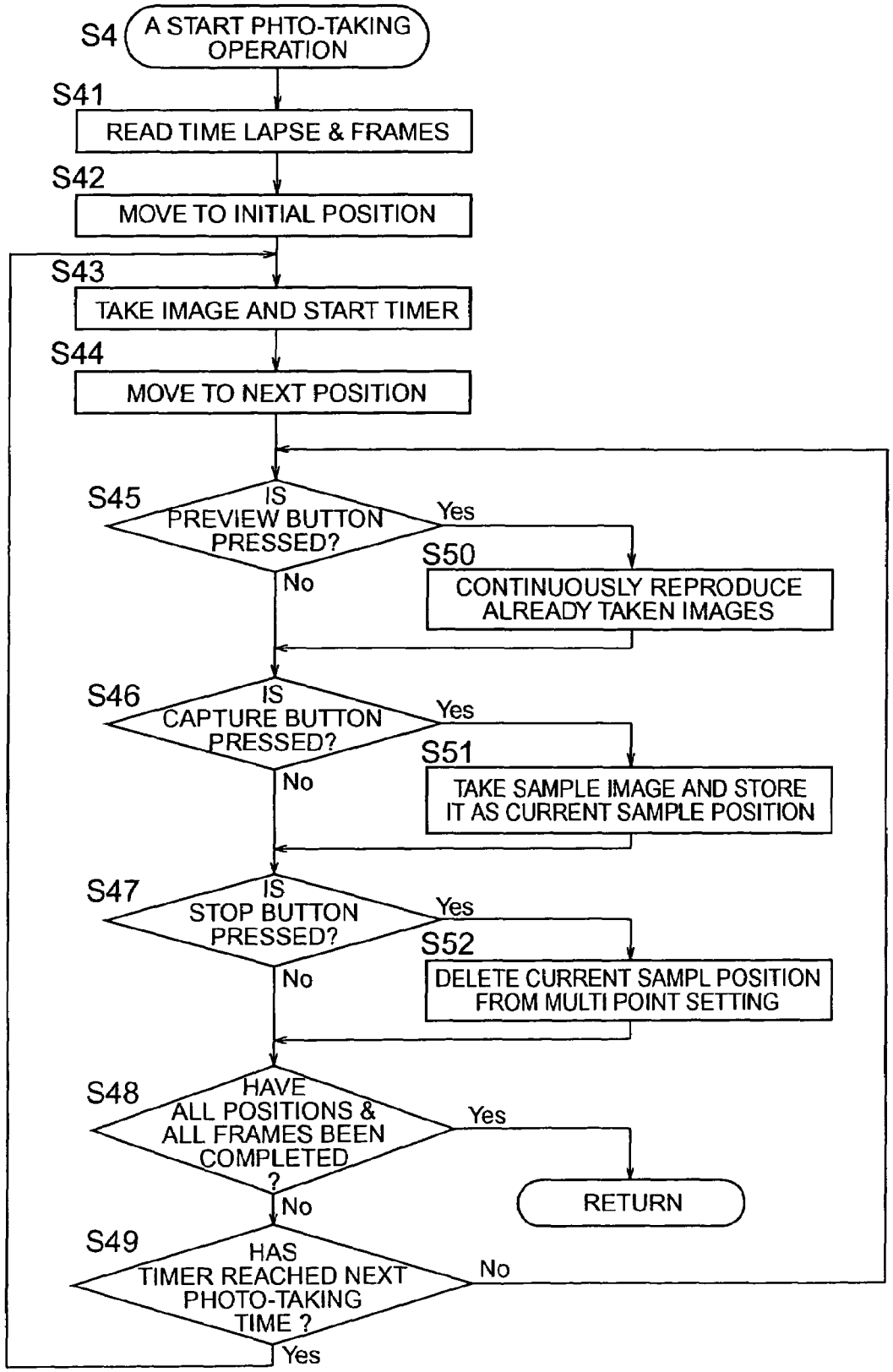
FIG. 5 is a behavior flowchart showing a start photo-taking subroutine in the behavior flowchart showing the intermittent photo-taking device according to the first embodiment of the present invention.
Figure 6:
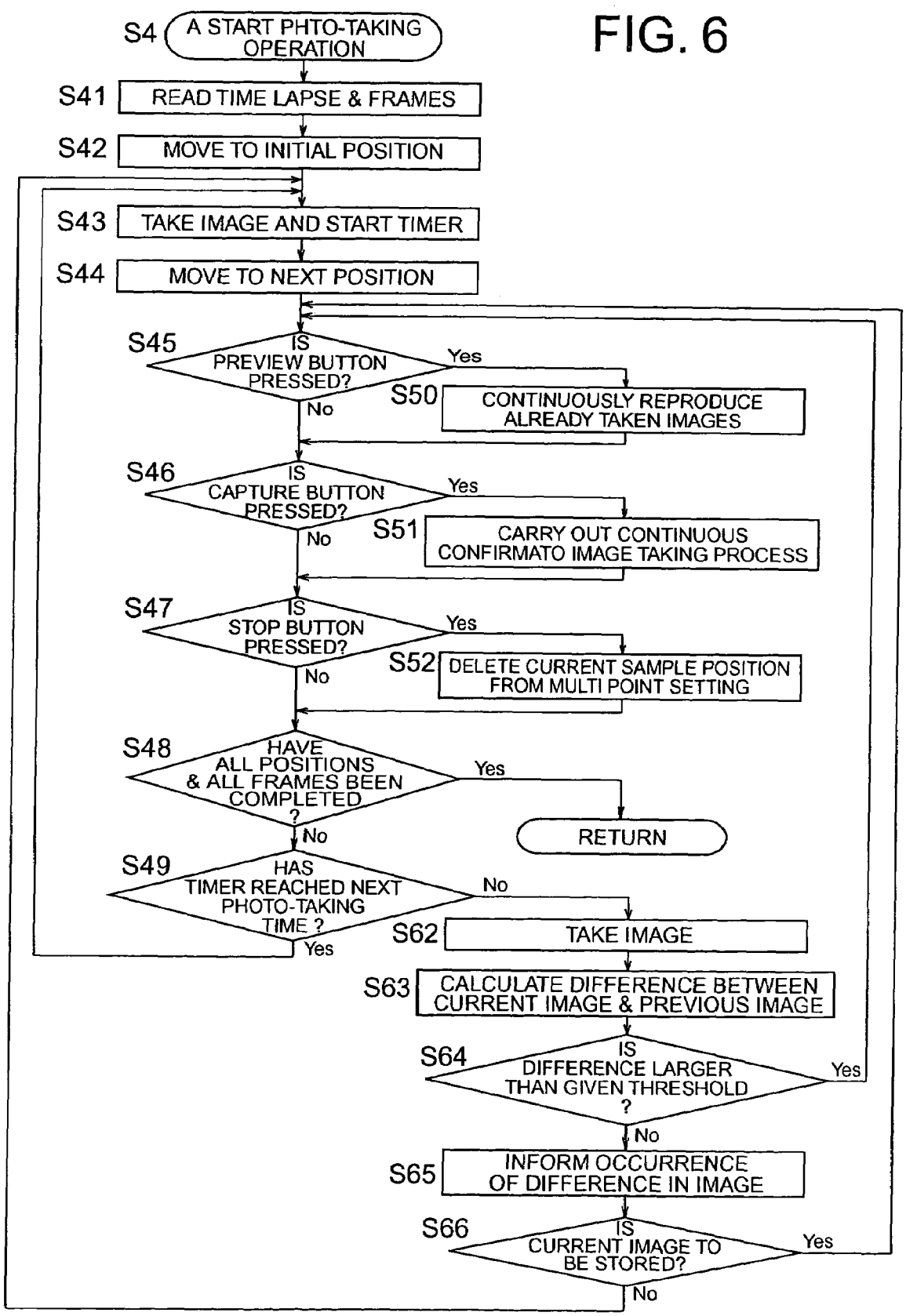
FIG. 6 is a behavior flowchart showing variation 1 of a start photo-taking subroutine in the behavior flowchart showing the intermittent photo-taking device according to the first embodiment of the present invention.

FIG. 6 is a behavior flowchart showing variation 1 of a start photo-taking subroutine in the behavior flowchart showing the intermittent photo-taking device shown in FIG. 5. The same reference symbol is attached to the same behavior as in FIG. 5, so the duplicated explanations are omitted.

(Step 51)

In step S46, when the system detects that the capture button 33 is pressed, the system carries out a continuous-confirmation-image-taking process (step S51). The system obtains maximum movie taking time information previously set on the operation window 20, takes images of the coordinate values of the sampling position of the sample continuously for the given time period, and stores in the memory as continuous images. While the aforementioned intermittent photo-taking operation is a series of still images taken with a time lapse, step S51 takes and stores a movie with a predetermined time length or, in stead of the movie, a series of still images of a predetermined time length with a given time lapse which are set separately.

(Step S62)

When the timer does not reach the next photo-taking time, the system automatically takes an image of the current sampling position.

(Step S63)

The system calculates the amount of variation by comparing the taken current image with the previous image. What is compared is the amount of difference obtained from respective images and a ratio (a percentage).

(Step S64)

Whether the calculated amount of variation is larger than a predetermined threshold value or not is checked. When the amount of variation is smaller than the threshold value, the flow proceeds to step S45. On the other hand, when the amount of variation is larger than the threshold value, the flow proceeds to step S65.

(Step S65)

In step S65, the system displays the taken image on the current-image-display window 22, and informs that the variation occurs. The way to notify is flashing a light attached on the system or going off a buzzer, or sending a mail to the user locating in a remote place.

(Step S66)

Upon receiving the notice, the user confirms the image displayed on the current-image-display window 22, and stores the image in the memory if necessary. After completing, the flow returns to step S43, and continues the intermittent photo-taking operation.

In this manner, in Variation 1, it becomes possible that the system automatically detects variation in the state of the sample and notifies the user. Moreover, when the user receives the notice, by confirming the image and pressing the capture button 33, the user can obtain images taken with an intermittent photo-taking condition set corresponding to the change, so that the user can record variation in the sample continuously. In this case, the images are taken at the sample position where variation was detected.

<Variation 2>

Figure 7:
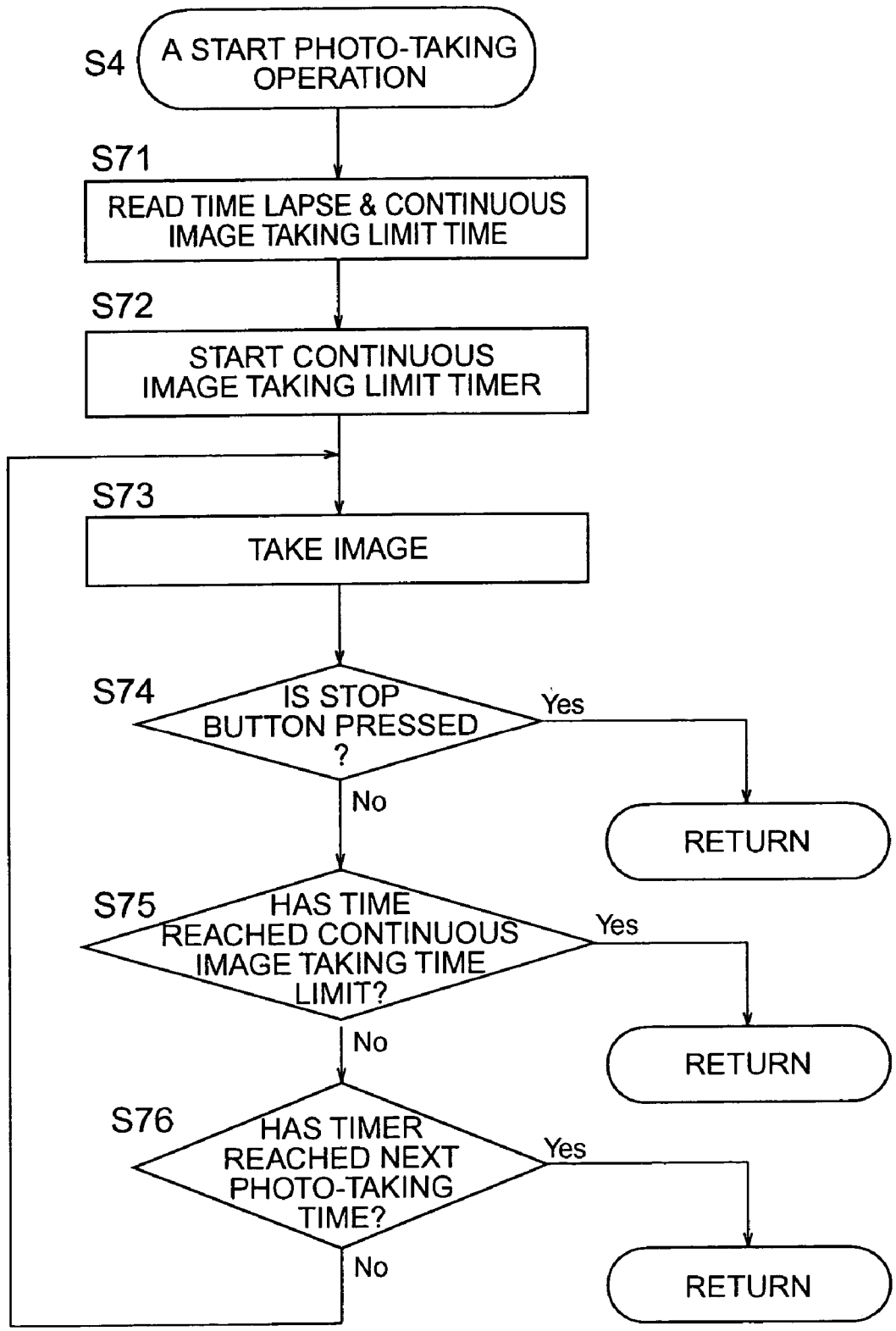
FIG. 7 is a behavior flowchart showing variation 2 of a start photo-taking subroutine in the behavior flowchart showing the intermittent photo-taking device according to the first embodiment of the present invention.

FIG. 7 is a behavior flowchart showing variation 2 of a start photo-taking subroutine in the behavior flowchart showing the intermittent photo-taking device according to the first embodiment of the present invention. Variation 2 has a feature that the image obtained by the intermittent photo-taking operation is a series of continuous images of a predetermined time length.

The explanation starts where the process in step S4 in FIG. 4 starts. The steps prior to step S4 is the same as those explained in the first embodiment.

(Step S71)

An intermittent photo-taking condition is read out and set on the intermittent photo-taking device 19. Conditions set in the time-lapse-setting window 23 and the sampling-position-setting window 24 on the operation window 20 shown in FIG. 3. In order to take continuous images of a predetermined time length, a continuous-image-taking-limit time length is set in advance by a widow (not shown).

(Step S72)

After setting a sampling position, a continuous-image-taking-limit timer is started.

(Step S73)

The sample image at the sampling position is taken.

(Step S74)

When the user presses the stop button (not shown) to stop taking images upon taking continuous images, the system stops taking continuous images and goes back to step S1.

(Step S75)

When the continuous-image-taking time of the sample reaches the predetermined continuous-image-taking-limit time length, the flow goes back to step S1.

(Step S76)

When the time from the last image taking reaches the set time for the intermittent photo-taking, the flow goes back to step S1. Otherwise, the flow carries out steps from S73 to S76 repeatedly.

In Variation 2, it becomes possible to continuously take images of the coordinate values of the sampling position up to the continuous-image-taking-limit time length.

Second Embodiment

Figure 8:
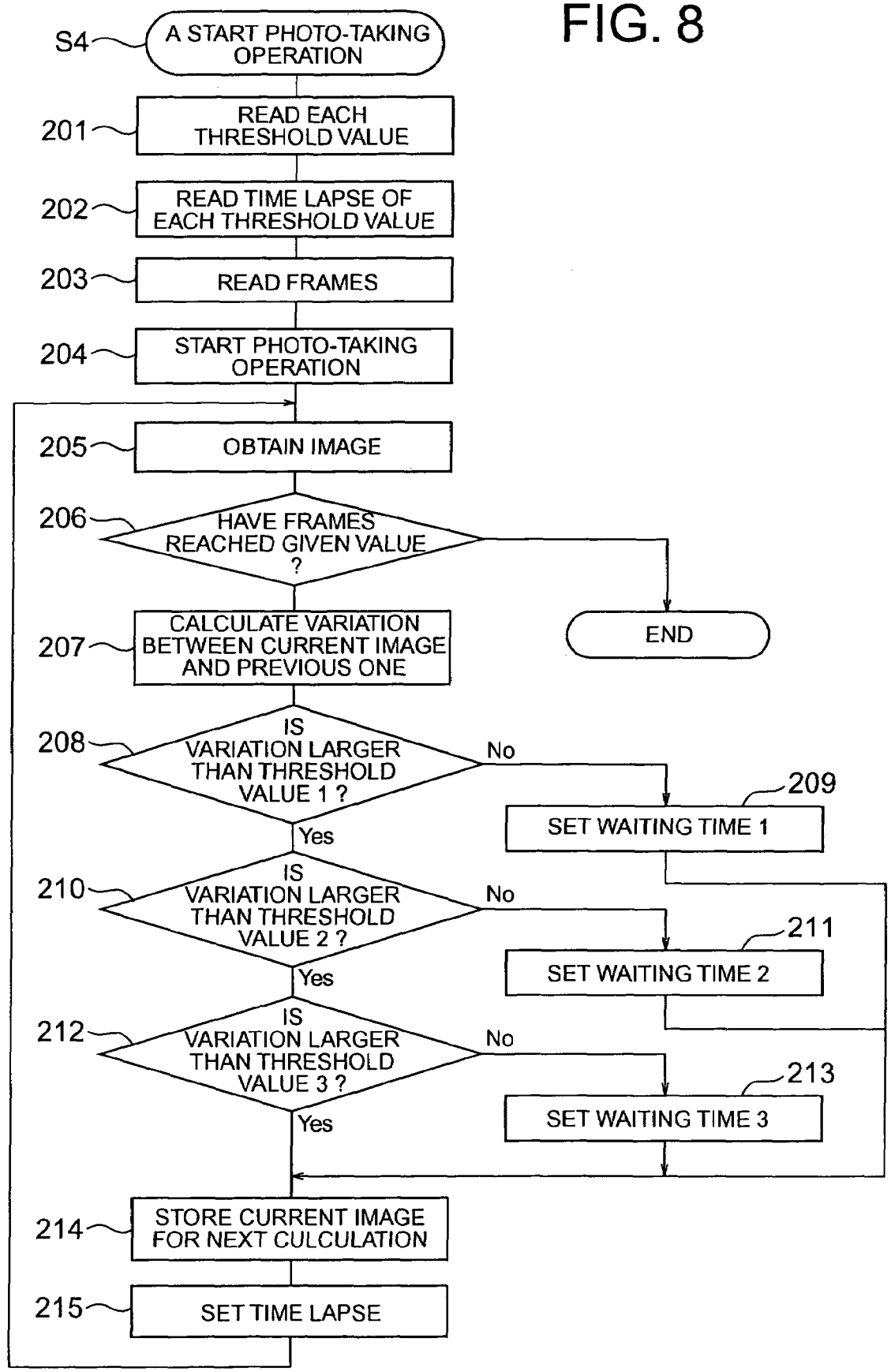
FIG. 8 is a behavior flowchart showing a start photo-taking subroutine in the behavior flowchart showing the intermittent photo-taking device according to a second embodiment of the present invention.

FIG. 8 is a behavior flowchart of the microscope system having the intermittent photo-taking device according to a second embodiment of the present invention. The explanation starts where the process in step S4 in FIG. 4 starts. The steps prior to step S4 are the same as those explained in the first embodiment.

In the second embodiment, by comparing the current image of the observing sample with a previous image (for example, an image taken at the photo-taking time immediately before the current image), when an amount of variation (such as variation in luminance of the image, or variation in the moving amount of the sample) corresponding to a given threshold value is detected, the system changes time lapse corresponding to the threshold value to take images.

Figure 9:
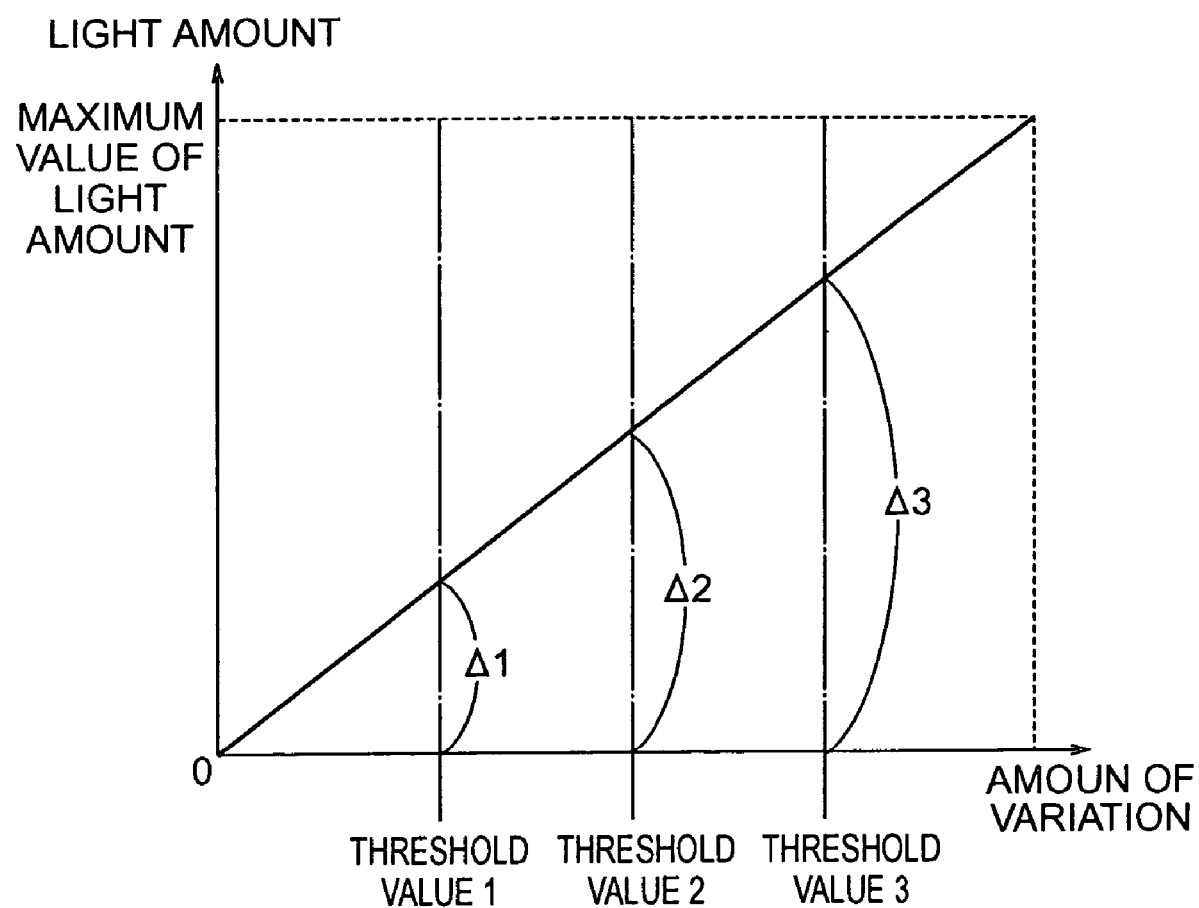
FIG. 9 is a graph showing an example of threshold values for changing an intermittent photo-taking condition in the behavior flowchart of FIG. 8.

FIG. 9 is a graph showing an example of threshold values for changing an intermittent photo-taking condition. Variation in the light amount from the sample is set with three grades of threshold values as an example. In FIG. 9, when variation in the light amount from the sample is $\Delta 1$, threshold value 1 is set, when variation is $\Delta 2$, threshold value 2 is set, and when variation is $\Delta 3$, threshold value 3 is set. Time lapse and the number of frames corresponding to each threshold value are input and set on the operation window 20 shown in FIG. 3.

Figure 3:
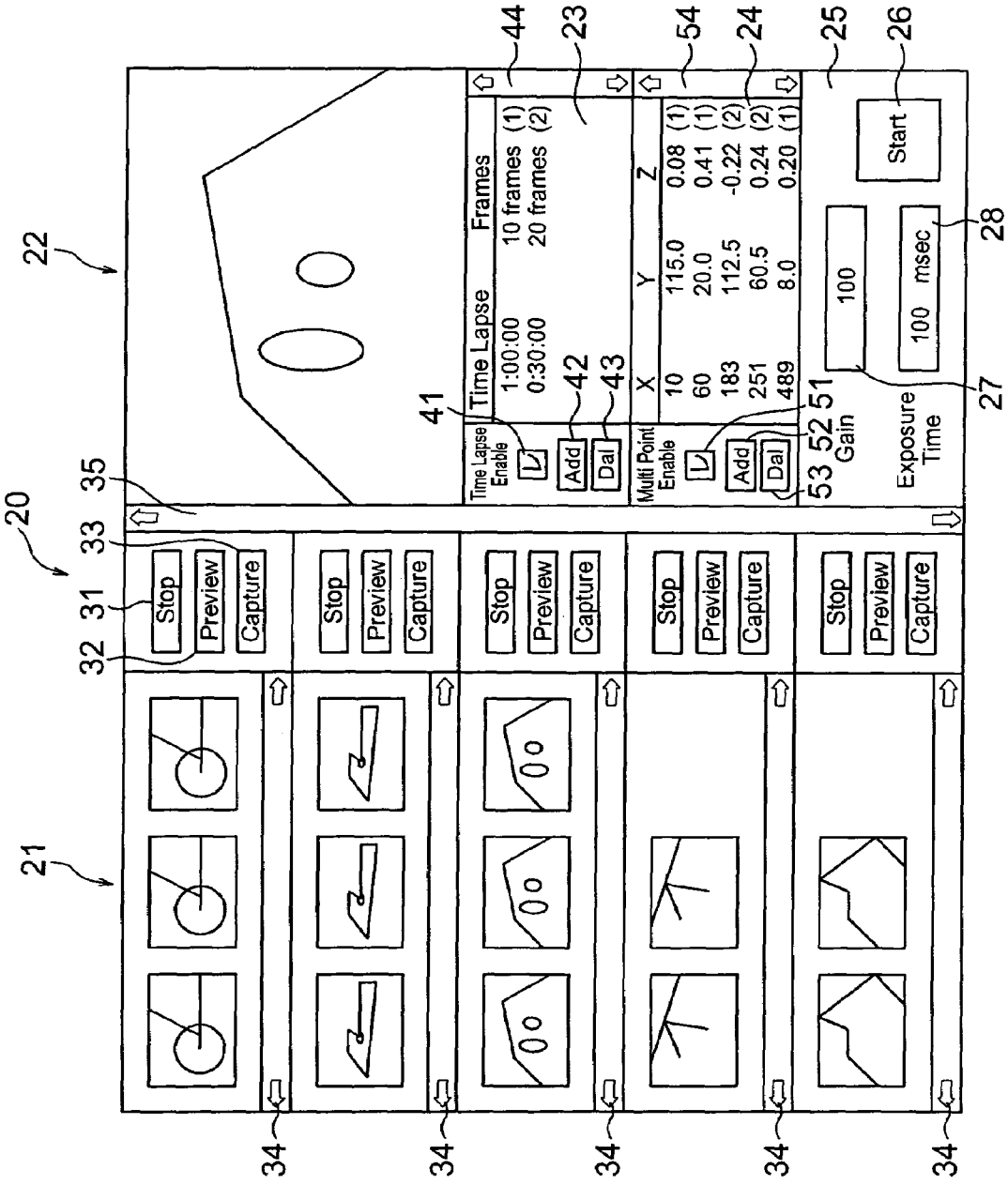
FIG. 3 is a schematic diagram showing an example of an operation window of the intermittent photo-taking device according to each embodiment of the present invention.

The observer sets respective variations in the light amount of the sample such as $\Delta 1$ corresponding to the threshold value 1, $\Delta 2$ corresponding to the threshold value 2, and $\Delta 3$ corresponding to the threshold value 3 shown in FIG. 9 through the operation window (GUI) 20 shown in FIG. 3. Although a window for setting the threshold value is not shown in FIG. 3, the setting is carried out by a sub-window (not shown). The number of threshold values is not limited to three.

Moreover, the observer sets time lapses corresponding to respective threshold values 1 through 3 by means of a sub-window (not shown) of the operation window 20. For example, when the variation in the light amount is large ($\Delta 3$), since change in the sample is sharp, in order to securely capture the change, a short time lapse is to be set to obtain the images.

Furthermore, the observer sets the number of frames, which is an intermittent photo-taking condition, through a sub-window (not shown) of the operation window 20. Incidentally, time lapse and the number of frames can be input through the time-lapse-setting window 23 on the operation window 20.

The second embodiment is explained below in accordance with the flowchart shown in FIG. 8.

(Step 201) to (Step 203)

Preparation stage of the intermittent photo-taking operation is completed by reading in the number of frames, each threshold value, and time lapse corresponding to the threshold value in order to carry out the intermittent photo-taking operation.

(Step 204)

The observer can start intermittent photo-taking operation by pressing the intermittent-image-obtaining button 41 in the operation window 20.

(Step 205)

The intermittent photo-taking device 19 (see FIG. 1) starts intermittent photo-taking operation at a given position of the sample in accordance with the set intermittent photo-taking conditions, and stores obtained images in a memory disposed in the intermittent photo-taking device 19.

(Step 206)

The intermittent photo-taking device 19 judges whether the number of taken frames reaches the number of frames read in step 203 or not, when the number of taken frames does not reach the number of read frames, the flow proceeds to step 207, otherwise the intermittent photo-taking operation is finished.

(Step 207)

The intermittent photo-taking device 19 compares the currently taken image with the image taken at the last time (or taken previously), and calculates an amount of variation in the image (such as variation in luminance of a predetermined detection area in the image). Comparison of images and calculation of variation are carried out by a comparing means and a calculating means, respectively, disposed in the intermittent photo-taking device 19.

(Step 208)

The intermittent photo-taking device 19 compares the amount of variation calculated in step 207 with the variation $\Delta 1$ of the threshold value 1 read in step 201, when the calculated amount of variation is less than the variation $\Delta 1$ of the threshold value 1, the flow goes to step 209, otherwise goes to step 210.

(Step 209)

When the amount of variation is less than the variation $\Delta 1$ of the threshold value 1, the time lapse of the intermittent photo-taking condition is set to a waiting time 1 corresponding to the threshold value 1 read in step 202, and the flow goes to step 214.

(Step 210)

When the amount of variation is more than the variation $\Delta 1$ of the threshold value 1, the amount of variation is compared with the variation $\Delta 2$ of the threshold value 2 read in step 201, when the amount of variation is less than the variation $\Delta 2$ of the threshold value 2, the flow goes to step 211, otherwise goes to step 212.

(Step 211)

When the amount of variation is less than the variation $\Delta 2$ of the threshold value 2, the time lapse of the intermittent photo-taking condition is set to a waiting time 2 corresponding to the threshold value 2 read in step 202, and the flow proceeds to step 214.

(Step 212)

When the amount of variation is more than the variation $\Delta 2$ of the threshold value 2, the amount of variation is compared with the variation $\Delta 3$ of the threshold value 3 read in step 201, when the amount of variation is less than the variation $\Delta 3$ of the threshold value 3, the flow goes to step 213, otherwise goes to step 214.

(Step 213)

When the amount of variation is less than the variation $\Delta 3$ of the threshold value 3, the time lapse of the intermittent photo-taking condition is set to a waiting time 3 corresponding to the threshold value 3 read in step 202, the flow proceeds to step 214. When the amount of variation is more than the variation Δ3 of the threshold value 3, the set time lapse of the intermittent photo-taking condition, which is already set, is not changed, and the flow proceeds to step 214.

(Step 214)

The intermittent photo-taking device 19 stores the current image used for comparison in the memory as an image for comparing variation at a next occasion.

(Step 215)

The intermittent photo-taking device 19 sets the time lapse of the intermittent photo-taking condition to any one of the set time lapse, the waiting time 1, waiting time 2 and the waiting time 3, and after the time lapse thus set has passed, the system goes to step 205 and carries out the following steps again.

In this manner, by carrying out the behavior flowchart shown in FIG. 8, the intermittent photo-taking device 19 obtains images of the designated sample position and stores them chronologically in the memory.

A microscope system having the intermittent photo-taking device according to the second embodiment of the present invention is controlled such that a current image of a designated sample position is compared with an image taken immediately before the current image (or taken in the past), an amount of variation in the image is calculated, the calculated amount of variation is compared with predetermined variations (Δ1 to Δ3) corresponding to threshold values, a threshold value is determined from the variation, and, after that, images are taken with a predetermined time lapse corresponding to the threshold value.

With controlling in this manner, the time lapse upon taking images can be changed in accordance with the amount of variation (threshold value) in the sample image, so that it becomes possible to securely capture the transformation of the sample.

When the time lapse is set to a constant value as in a conventional system, there is a possibility that the sample images upon transforming fail to be taken. On the contrary, in the second embodiment of the present invention, since the amount of the variation (threshold value) of the image is detected, and the time lapse for taking the image is automatically changed, so that the transformation of the sample can be securely captured.

Moreover, even if the sample is gradually changed, since the system can change the time lapse shorter or longer according to the amount of variation (threshold value), it becomes possible to securely capture the transformation of the sample within the predetermined number of frames. In other words, even if the number of frames is constant, by setting the time lapse long upon small amount of variation (threshold value), or by setting the time lapse short upon large amount of variation (threshold value), it becomes possible to securely capture the transformation of the sample within the predetermined number of frames.

The system may be constructed such that in stead of reading the number of frames in step 203, the total time length for the intermittent photo-taking operation is read. When the total time length is set to be longer than the time length in which the transformation of the sample converges, the images of the sample from the start to the convergence of the transformation can be securely captured. Moreover, when the amount of variation (threshold value) of the sample is large, the images are taken with a short time lapse. On the other hand, when the amount of variation (threshold value) of the sample is small, the images are taken with a long time lapse. Accordingly, the number of images to be taken can be minimum, so that the capacity of the memory can be small. When the total time length is read, step 206 is changed such that in step 206, whether a summation of the intermittent photo-taking time reaches the total time length or not is checked. In other words, the parameter read in step 203 is used as a parameter for the conditional jump in step 206.

Third Embodiment

Figure 10:
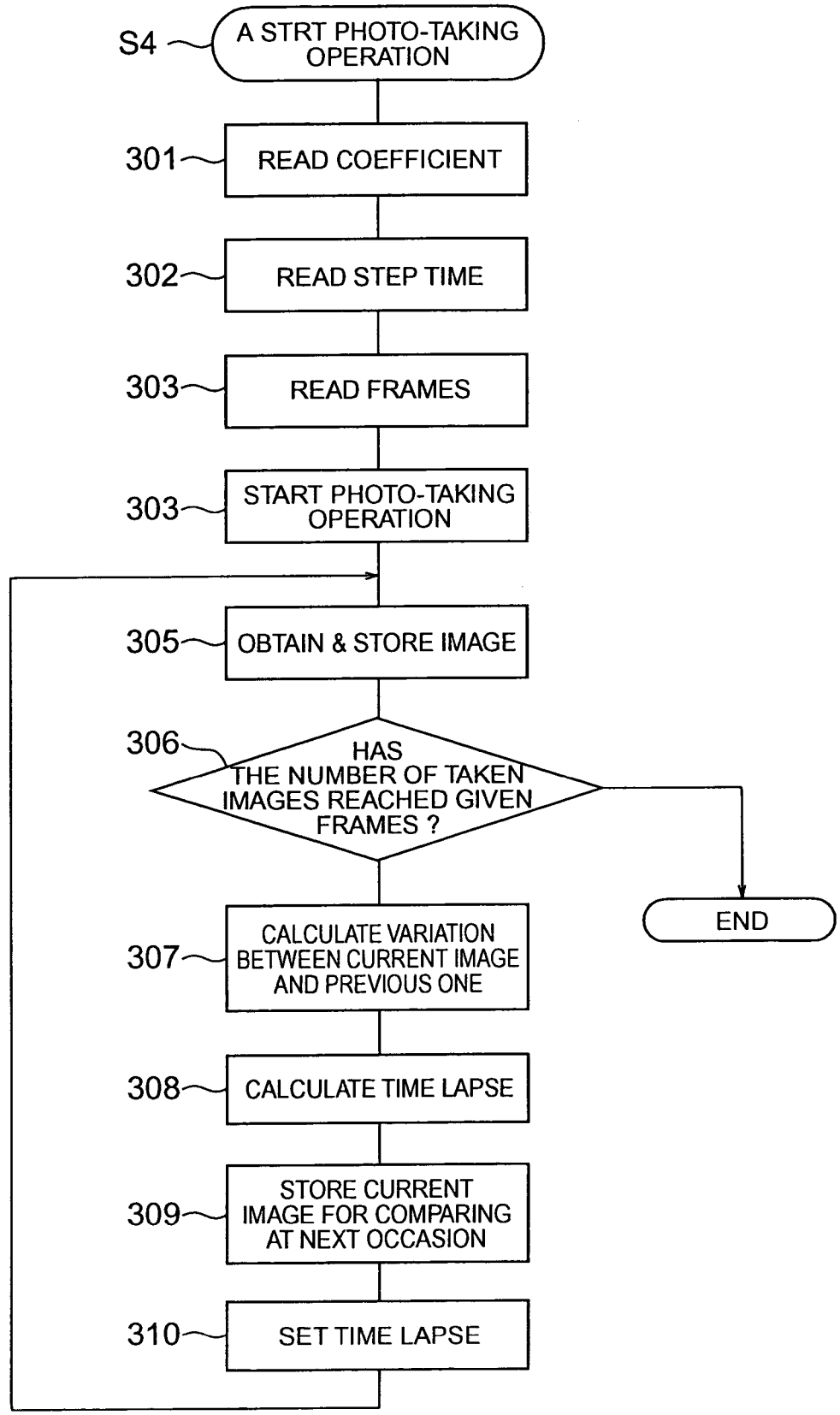
FIG. 10 is a behavior flowchart showing a start photo-taking subroutine in the behavior flowchart showing the intermittent photo-taking device according to a third embodiment of the present invention.

FIG. 10 is a flowchart showing the behavior of the intermittent photo-taking device according to a third embodiment of the present invention. The explanation starts where the process in step S4 in FIG. 4 starts. The steps prior to step S4 are the same as those explained in the first embodiment.

As same as the second embodiment, the system according to the third embodiment carries out intermittent photo-taking operation such that by comparing the current image of the observing sample with a previous image (for example, an image taken at the time immediately before the current image), when an amount of variation in the current image is detected, the system sets the time lapse corresponding to the amount of variation. Although the time lapse is varied stepwise in the second embodiment, it can be varied almost continuously corresponding to the amount of variation in the image in the third embodiment. Hereinafter the time lapse varying stepwise is called a "step time" in a manner.

The time lapse according to the third embodiment is made connection with the amount of variation in the image by the following expression (1):

$$\text{time lapse} = (1/\text{amount of variation}) \times (\text{coefficient}) \times (\text{step time}) \qquad (1)$$

where the coefficient is a variable for making agreement on the dimension between both sides of the expression (1) and setting a preferable time lapse. Incidentally, when the amount of variation is zero, the time lapse used currently is continuously used.

Parameters such as the coefficient, step time in expression (1), and the number of frames are set by an observer in advance through a sub-window (not shown) of the operation window 20 (see FIG. 3) of the intermittent photo-taking device 19 (see FIG. 1). Incidentally, the step time and the number of frames may be set through the time-lapse-setting window 23 of the operation window 20.

The behavior of the third embodiment is explained below with reference to the flowchart shown in FIG. 10.

(Step 301) to (Step 303)

Preparation stage of the intermittent photo-taking operation is completed by reading in the coefficient, the step time, and the number of frames in order to carry out the intermittent photo-taking operation.

(Step 304)

An observer starts the intermittent photo-taking operation by pressing the intermittent-image-obtaining button 41 in the operation window 20.

(Step 305)

The intermittent photo-taking device 19 starts the intermittent photo-taking operation at a given position of the sample in accordance with the set intermittent photo-taking condition, and stores obtained images in a memory disposed in the intermittent photo-taking device 19.

(Step 306)

The intermittent photo-taking device 19 judges whether the number of taken frames reaches the number of frames read in step 303 or not, when the number of taken frames does not reach the number of read frames, the flow proceeds to step 307, otherwise the intermittent photo-taking operation is terminated.

(Step 307)

The intermittent photo-taking device 19 compares the currently taken image with the image taken at the last time (or taken in the past), and calculates an amount of variation in the image. Comparison of images and calculation of variation are carried out by a comparing means and a calculating means, respectively, disposed in the intermittent photo-taking device 19.

(Step 308)

From the amount of variation calculated in step 307, the coefficient read in step 301, and the step time read in step 302, the intermittent photo-taking device 19 calculates the time lapse corresponding to the amount of variation on the basis of expression (1)

(Step 309)

The intermittent photo-taking device 19 stores the current image used for the comparison in the memory as an image for comparing variation at a next occasion.

(Step 310)

The intermittent photo-taking device 19 sets the time lapse calculated in step 308, goes back to step 305, and carries out the following steps again.

In this manner, by carrying out the flowchart shown in FIG. 10, the intermittent photo-taking device 19 obtains images of the designated sample position and stores chronologically in the memory.

In the third embodiment, the time lapse is set such that by comparing the current image with a previous image (such as an image taken at the immediately before) an amount of variation in the image is calculated, and a time lapse calculated on the basis of expression (1) is set. For example, when the amount of variation is large, the time lapse becomes short. When the amount of variation is small, the time lapse becomes long. In this manner, in accordance with the amount of variation the length of the time lapse can be set.

Moreover, since the intermittent photo-taking device 19 can automatically set the time lapse in accordance with the amount of variation in the sample image on the basis of expression (1), when the amount of variation is large, a large number of images can be obtained by shortening the time lapse. On the other hand, when the amount of variation is small, by extending the time lapse, the number of frames to be obtained can be small. As a result, a large number of required images upon large amount of variation can be obtained within a short time period, so that variation in the sample can be securely captured.

Since the time lapse is automatically set in accordance with the amount of variation in the sample image, even if the way of variation in the sample is unpredictable, variation in the sample can be securely captured.

Moreover, when the time lapse is determined in a constant time length as a conventional case, there is a danger of failing to capture required images, while in the third embodiment since the time lapse for obtaining an image is automatically changed by detecting the amount of variation in the image, variation in the sample can be securely captured.

Furthermore, even if the amount of variation in the sample image is varies, since the time lapse can be set longer or shorter in accordance with the amount of variation, variation in the sample can be securely captured within a predetermined number of frames. In other words, in the predetermined number of frames, the time lapse is set longer when the amount of variation is small, and the time lapse is set shorter when the amount of variation is large, so that the intermittent photo-taking over a long time period becomes possible with small memory capacity as well as variation in the sample can be securely captured.

In step 303, a total time length of the intermittent photo-taking operation may be set in stead of the number of frames. When the total time length is set to be longer than the time length in which the transformation of the sample converges, the images of the sample from the start to the convergence of the transformation can be securely captured. When the total time length is read, step 306 is changed such that in step 306, whether a summation of the intermittent photo-taking time reaches the total time length or not is checked. In other words, the parameter read in step 303 is used as a parameter for the conditional jump in step 306.

As described above, in a microscope system having an intermittent photo-taking device according to the present invention, even in the middle of the intermittent photo-taking operation, a user can observe and confirm the current state of the sample at will whenever the user likes. In the multi point intermittent photo-taking, the intermittent photo-taking of only a given sampling position of the sample can be canceled without effecting that of the other sampling positions. According to the present invention, it becomes possible to prevent taking unnecessary images, reduce damage to the fluorescence observation sample, and reduce the amount of data stored in the memory.

In this manner, in the microscope system having the intermittent photo-taking device according to present invention, it becomes possible to provide a system having high convenience for users.

The above-described each embodiment is only an example, so that the present invention is not limited to the above-described construction or shape. It is needless to say that various modifications may be made without departing from the spirit or scope of the present invention.

What is claimed is:

1. An intermittent photo-taking device comprising:
a condition setting means that sets an intermittent photo-taking condition composed of a given time lapse and a number of frames to be photo-taken;
an image capturing means that captures an image taken under the intermittent photo-taking condition;
a setting change means that changes the intermittent photo-taking condition to a different condition in the middle of an operation based on the intermittent photo-taking condition set by the condition setting means; and
a memory that, when the intermittent photo-taking condition has been changed by the setting change means, stores an image taken under the different condition following an image taken under the condition before changing.

2. The intermittent photo-taking device according to claim 1, wherein the intermittent photo-taking condition can be manually changed through the setting change means.

3. The intermittent photo-taking device according to claim 1, wherein the setting change means detects variation between a current image captured by the image capturing means and a previous image, and automatically sets the intermittent photo-taking condition to a different condition corresponding to the detected variation.

4. The intermittent photo-taking device according to claim 3, wherein the time lapse in the automatically set intermittent photo-taking condition has been changed.

5. The intermittent photo-taking device according to claim 3, further comprising:
an alarm means that gives an alarm when an amount of the detected variation is a given value or more.

6. A microscope system configured to use the intermittent photo-taking device according to claim 3.

7. The intermittent photo-taking device according to claim 1, further comprising:
a reproducing controller capable of reproducing any of the images taken under the intermittent photo-taking condition without interrupting the intermittent photo-taking operation.

8. A microscope system configured to use the intermittent photo-taking device according to claim 7.

9. The intermittent photo-taking device according to claim 1, further comprising:
an image display that shows the image taken under the intermittent photo-taking condition;
a current image display that shows an image of a current sample position,
wherein the image display includes an interruption button for interrupting taking an image, a reproduction button for reproducing a captured image, an image storing button for storing an image shown on the current image display and an image scroll button.

10. A microscope system configured to use the intermittent photo-taking device according to claim 1.

11. An intermittent photo-taking device comprising:
a condition setting means that sets an intermittent photo-taking condition composed of a given time lapse and a number of frames;
an image capturing means that captures an image taken under the intermittent photo-taking condition; and
a setting change means that detects variation between a current image and a previous image captured by the image capturing means, automatically sets the intermittent photo-taking condition to an intermittent photo-taking condition to a different condition corresponding to the variation in the image in the middle of an operation based on the intermittent photo-taking condition set by the condition setting means, and continues the intermittent photo-taking operation.

12. The intermittent photo-taking device according to claim 11, wherein the time lapse in the automatically set intermittent photo-taking condition has been changed.

13. A microscope system configured to use the intermittent photo-taking device according to claim 11.

* * * * *